United States Patent
Chakravarthy et al.

(10) Patent No.: US 12,330,572 B2
(45) Date of Patent: Jun. 17, 2025

(54) HIDDEN WINCH ASSEMBLY FOR A VEHICLE

(71) Applicant: Rivian IP Holdings, LLC, Irvine, CA (US)

(72) Inventors: Varun Chakravarthy, Irvine, CA (US); Alexandra Anderson, Escondido, CA (US)

(73) Assignee: Rivian IP Holdings, LLC, Irvine, CA (US)

( * ) Notice: Subject to any disclaimer, the term of this patent is extended or adjusted under 35 U.S.C. 154(b) by 0 days.

(21) Appl. No.: 17/899,018

(22) Filed: Aug. 30, 2022

(65) Prior Publication Data

US 2024/0067112 A1 Feb. 29, 2024

(51) Int. Cl.
*B60R 19/48* (2006.01)
*B66D 1/28* (2006.01)

(52) U.S. Cl.
CPC ............ *B60R 19/48* (2013.01); *B66D 1/28* (2013.01); *B66D 2700/0183* (2013.01)

(58) Field of Classification Search
CPC .... B60R 19/48; B66D 1/28; B66D 2700/0183
See application file for complete search history.

(56) References Cited

U.S. PATENT DOCUMENTS

| | | | | |
|---|---|---|---|---|
| 3,788,605 A * | 1/1974 | Johnson | ............... | B66D 3/006 251/166 |
| 5,215,325 A * | 6/1993 | Novotny | ............... | B60D 1/185 280/480.1 |
| 7,344,120 B2 * | 3/2008 | McFarland | ............... | B66D 1/00 254/323 |
| 10,220,760 B2 * | 3/2019 | Swenson | ............... | B62D 51/02 |
| 2011/0226830 A1 * | 9/2011 | West, Jr. | ............... | B66D 3/006 224/539 |
| 2015/0137054 A1 * | 5/2015 | Smith | ............... | B66D 1/38 254/323 |
| 2015/0274493 A1 * | 10/2015 | Shiokawa | ............... | B66D 1/28 254/323 |
| 2016/0221807 A1 * | 8/2016 | Kleinatland | ............... | B66D 1/00 |
| 2019/0084466 A1 * | 3/2019 | Marchlewski | ............... | B66D 1/46 |

FOREIGN PATENT DOCUMENTS

| | | | | |
|---|---|---|---|---|
| CN | 111703388 A | * | 9/2020 | ............ B60R 19/02 |
| JP | H05345552 A | * | 12/1993 | ............ B60R 19/48 |

* cited by examiner

*Primary Examiner* — Sang K Kim
*Assistant Examiner* — Nathaniel L Adams
(74) *Attorney, Agent, or Firm* — Patterson + Sheridan, LLP (57) ABSTRACT

A hidden winch assembly for a vehicle, including: a winch assembly including a mounting structure defining a plurality of mounting points disposed on one side of the winch assembly; and a bumper structure including a mounting plate disposed on a back side of the bumper structure, wherein the mounting plate is disposed at an angle between a vertical plane of the vehicle and a horizontal plane of the vehicle; wherein the mounting structure of the winch assembly is coupled to the mounting plate of the bumper structure at the plurality of mounting points via a plurality of fasteners. A top portion of the bumper structure and/or the surrounding fascia component(s) define an opening through which the winch assembly can be viewed and/or accessed from an exterior of the vehicle. The opening includes one of a fixed panel, a removable access panel, a pivotable access panel, and a translatable access panel.

22 Claims, 6 Drawing Sheets

HIDDEN WINCH ASSEMBLY FOR A VEHICLE

INTRODUCTION

The present disclosure relates to the automotive field. More particularly, the present disclosure relates to a hidden winch assembly for a vehicle having a feet-up-and-forward mounting arrangement and a viewing window for increasing visibility of and access to the associated winch line from outside the vehicle.

Winch assemblies are often mounted feet-down on an exterior bumper structure of a vehicle in an open configuration, providing access to controls disposed on the winch assembly, as well as visibility of and access to the associated winch line (i.e., cable or rope) from outside the vehicle. Thus, a user can ensure that the winch line is properly spooled on the winch assembly when retracted and access the winch assembly to perform any necessary adjustments or repairs. Alternatively, winch assemblies are mounted feet-down partially behind an exterior bumper structure of a vehicle in a partially-hidden configuration, again providing access to controls disposed on the winch assembly, as well as visibility of and access to the associated winch line from outside the vehicle, but improving vehicle aerodynamics and aesthetics to some extent. Finally, winch assemblies may be mounted feet-down to or behind a bumper structure of a vehicle and within the internal space of the vehicle in a hidden configuration. Here, winch assembly controls are optionally removed and typically routed to the vehicle cabin or a remote control and the associated winch line is routed around or through the bumper structure, which is typically metal, and/or around or through any front or rear fascia components, which are typically plastic, disposed adjacent to the bumper structure. This improves vehicle aerodynamics and aesthetics, but sacrifices visibility of and access to the associated winch line from outside the vehicle.

The present introduction provides an illustrative environmental context in which the concepts of the present disclosure may be implemented. It will be readily apparent to those of ordinary skill in the art that the concepts of the present disclosure may be implemented in other environmental contexts as well, without limitation.

SUMMARY

The present disclosure provides a winch assembly that is mounted feet-up-and-forward to and behind a bumper structure of a vehicle and within the internal space of the vehicle in a hidden configuration. Winch assembly controls are removed and routed to the vehicle cabin or a remote control and the associated winch line (i.e., cable or rope) is routed around or through the bumper structure, which is typically metal, and/or around or through any front fascia components, which are typically plastic, disposed adjacent to the bumper structure. This improves vehicle aerodynamics and aesthetics. Visibility of and access to the associated winch line from outside the vehicle is provided by a viewing/access window disposed through the bumper structure and/or through a front fascia component adjacent to the bumper structure. This viewing window is selectively covered by an associated door or panel. Further, access to the winch assembly may be provided from underneath the vehicle via an access panel disposed in a skid plate or the like coupled to the bottom of the vehicle in the vicinity of the winch assembly.

In one illustrative embodiment, the present disclosure provides a hidden winch assembly for a vehicle, including: a winch assembly including a mounting structure defining a plurality of mounting points disposed on one side of the winch assembly; and a bumper structure including a mounting plate disposed on a back side of the bumper structure, wherein the mounting plate is disposed at an angle between a vertical plane of the vehicle and a horizontal plane of the vehicle; wherein the mounting structure of the winch assembly is coupled to the mounting plate of the bumper structure at the plurality of mounting points via a plurality of fasteners. One or more of the mounting plate and the bumper structure define an opening adapted to allow a winch line of the winch assembly to pass through to an exterior of the vehicle. A top portion of the bumper structure defines an opening through which the winch assembly can be viewed and/or accessed from an exterior of the vehicle. The opening defined by the top portion of the bumper structure includes one of a fixed panel, a removable access panel, a pivotable access panel, and a translatable access panel disposed therein. The one of the fixed panel, the removable access panel, the pivotable access panel, and the translatable access panel includes a transparent viewing window. The bumper structure includes an exterior bumper structure of the vehicle that is adapted to be coupled to a frame of the vehicle. Alternatively, the bumper structure includes an internal bumper structure of the vehicle that is adapted to be coupled to a frame of the vehicle behind or through a bumper beam of the vehicle. Alternatively, the bumper structure includes an internal bumper structure of the vehicle that is adapted to be coupled to a frame of the vehicle behind a fascia component of the vehicle.

In another illustrative embodiment, the present disclosure provides a vehicle, including: a bumper structure including a mounting plate disposed on a back side of the bumper structure, wherein the mounting plate is disposed at an angle between a vertical plane of the vehicle and a horizontal plane of the vehicle, and wherein the mounting plate is adapted to receive a plurality of fasteners for coupling a winch assembly including a mounting structure defining a plurality of mounting points disposed on one side of the winch assembly to the mounting plate; and a fascia component disposed one or more of adjacent to and around the bumper structure. One or more of the mounting plate, the bumper structure, and the fascia component define an opening adapted to allow a winch line of the winch assembly to pass through to an exterior of the vehicle. One or more of a top portion of the bumper structure and the fascia component define an opening through which the winch assembly can be viewed and/or accessed from an exterior of the vehicle. The opening defined by the one or more of the top portion of the bumper structure and the fascia component includes one of a fixed panel, a removable access panel, a pivotable access panel, and a translatable access panel disposed therein. The one of the fixed panel, the removable access panel, the pivotable access panel, and the translatable access panel includes a transparent viewing window. The bumper structure includes an exterior bumper structure of the vehicle that is coupled to a frame of the vehicle. Alternatively, the bumper structure includes an internal bumper structure of the vehicle that is coupled to a frame of the vehicle behind or through a bumper beam of the vehicle. The vehicle further includes a skid plate disposed along a bottom of the vehicle beneath the mounting plate of the bumper structure, wherein the skid plate includes an access panel adapted to provide access to the winch assembly from underneath the vehicle.

In a further illustrative embodiment, the present disclosure provides a body assembly for a vehicle, including: a bumper structure including a mounting plate, wherein the mounting plate is adapted to receive a plurality of fasteners for coupling a winch assembly including a mounting structure defining a plurality of mounting points disposed on one side of the winch assembly to the mounting plate; and a fascia component disposed one or more of adjacent to and around the bumper structure; wherein one or more of a top portion of the bumper structure and the fascia component define an opening through which the winch assembly can be viewed and/or accessed from an exterior of the vehicle. The mounting plate is disposed on a back side of the bumper structure at an angle between a vertical plane of the vehicle and a horizontal plane of the vehicle. The opening defined by the one or more of the top portion of the bumper structure and the fascia component includes one of a fixed panel, a removable access panel, a pivotable access panel, and a translatable access panel disposed therein. The one of the fixed panel, the removable access panel, the pivotable access panel, and the translatable access panel includes a transparent viewing window.

BRIEF DESCRIPTION OF THE DRAWINGS

The present disclosure is illustrated and described with reference to the various drawings, in which like reference numbers are used to denote like assembly components/method steps, as appropriate, and in which.

DETAILED DESCRIPTION

Figure 1A:
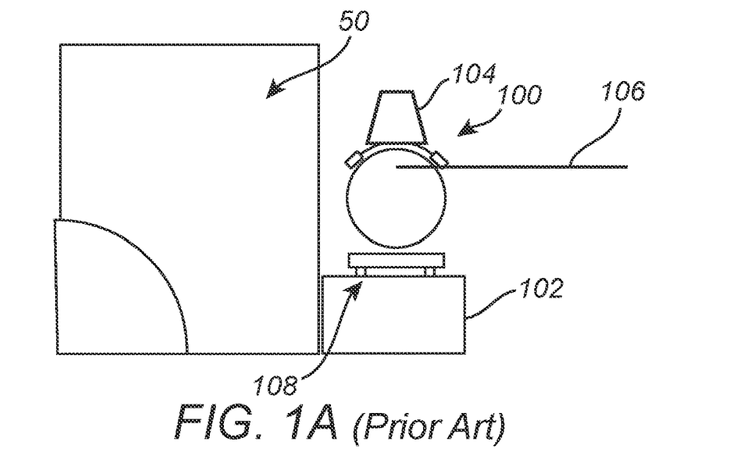
FIGS. 1A-1C are schematic diagrams illustrating several open, partially-hidden, and hidden configurations for mounting a winch assembly on a vehicle.

Referring specifically to FIG. 1A, a winch assembly 100 is often mounted feet-down on an exterior bumper structure 102 of a vehicle 50 in an open configuration, providing access to controls 104 disposed on the winch assembly 100, as well as visibility of and access to the associated winch line 106 from outside the vehicle 50. In such examples, the mounts 108 disposed at the bottom of the winch assembly 100 are simply secured to the top of the exterior bumper structure 102 outside the vehicle 50, with the crossmember and controls 104 disposed at the top of the winch assembly 100 open to the environment and visually un-occluded. In this configuration, the fasteners (i.e., bolts) at the mounts 108 of the winch assembly 100 are in shear when the winch assembly 100 is in use.

Figure 1B:
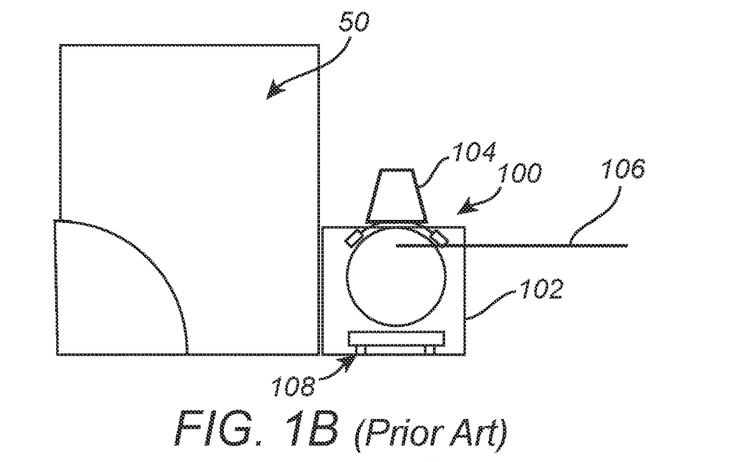

Referring specifically to FIG. 1B, a winch assembly 100 may be mounted feet-down partially behind an exterior bumper structure 102 of a vehicle 50 in a partially-hidden configuration, again providing access to controls 104 disposed on the winch assembly 100, as well as visibility of and access to the associated winch line 106 from outside the vehicle 50. Specifically, the mounts 108 disposed at the bottom of the winch assembly 100 are simply secured to the bottom of the exterior bumper structure 102 outside the vehicle 50, with the crossmember and controls 104 disposed at the top of the winch assembly 100 partially open to the environment and partially visually un-occluded. Here, the exterior bumper structure 102 may be a bumper beam or another structure adjacent to the bumper beam. In the latter case, the mounts 108 disposed at the bottom of the winch assembly 100 may be secured to the top of this other structure behind the bumper beam and outside the vehicle 50. In this configuration, the fasteners (i.e., bolts) at the mounts 108 of the winch assembly 100 are again in shear when the winch assembly 100 is in use.

Figure 1C:
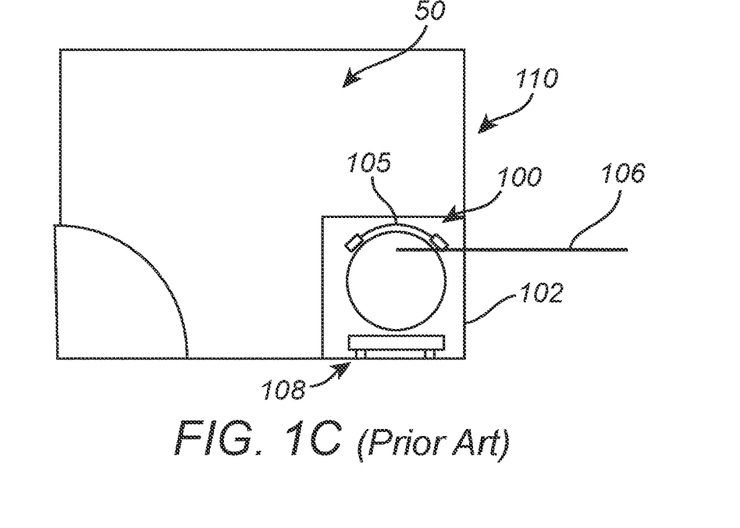

Referring specifically to FIG. 1C, a winch assembly 100 may be mounted feet-down to or behind a bumper structure 102 of a vehicle 50 and within the internal space of the vehicle 50 in a hidden configuration. Here, winch assembly controls 104 (FIGS. 1A and 1B) are optionally removed and typically routed to the vehicle cabin or a remote control and the associated winch line 106 is routed around or through the bumper structure 102, which is typically metal, and/or around or through any front or rear fascia components 110, which are typically plastic, disposed adjacent to the bumper structure 102. This sacrifices visibility of and access to the associated winch line 106 from outside the vehicle 50. Specifically, the mounts 108 disposed at the bottom of the winch assembly 100 are simply secured to the bottom of the bumper structure 102 within the vehicle 50. Here, again, the bumper structure 102 may be an exterior or internal bumper beam or another internal structure adjacent to the bumper beam. In the latter case, the mounts 108 disposed at the bottom of the winch assembly 100 may be secured to the top of this other structure behind the bumper beam and inside the vehicle 50. In this configuration, the fasteners (i.e., bolts) at the mounts 108 of the winch assembly 100 are again in shear when the winch assembly 100 is in use.

Figure 2:
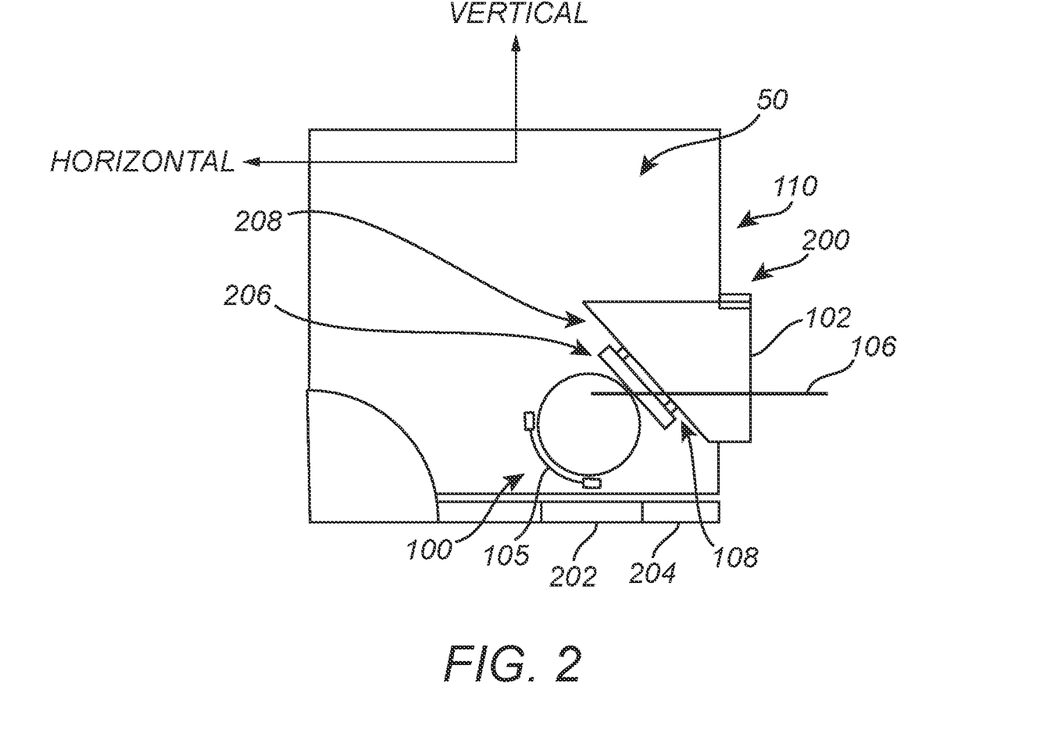
FIG. 2 is a schematic diagram illustrating a hidden configuration for mounting a winch assembly on a vehicle in accordance with illustrative embodiments of the present disclosure, highlighting the use of an angled mounting plate, a viewing/access window, and an optional skid plate access panel.

Referring specifically to FIG. 2, in various illustrative embodiments, the present disclosure provides a winch assembly 100 that is mounted feet-up-and-forward to and behind a bumper structure 102 of a vehicle 50 and within the internal space of the vehicle 50 in a hidden configuration. Local winch assembly controls 104 (FIGS. 1A and 1B) are removed/not used and routed to the vehicle cabin or a remote control and the associated winch line (i.e., cable or rope) 106 is routed around or through the bumper structure 102, which is typically metal, and/or around or through any front fascia components 110, which are typically plastic, disposed adjacent to the bumper structure 102. In such configurations, vehicle aerodynamics and aesthetics may be improved. Visibility of and access to the associated winch line 106 and other winch components from outside the vehicle 50 is provided by a viewing window 200 disposed through the bumper structure 102 and/or through a front fascia component 110 adjacent to the bumper structure 102. Further, access to the winch assembly 100 may be provided from underneath the vehicle 50 via an access panel 202 disposed in a skid plate 204 or the like coupled to the bottom of the vehicle 50 in the vicinity of the winch assembly 100. In general, the winch assembly 100 includes a mounting structure 206 defining the plurality of mounting points 108 disposed on one side of the winch assembly 100. The bumper structure 102 includes a mounting plate 208 disposed on a back side of the bumper structure 102. The mounting plate 208 is disposed at an angle between a vertical plane of the vehicle 50 and a horizontal plane of the vehicle 50. The mounting structure 206 of the winch assembly 100 is coupled to the mounting plate 208 of the bumper structure 102 at the plurality of mounting points 108 via a plurality of fasteners, such as bolts or the like. Due to the use of the angled mounting plate 208, the fasteners at the mounts 108 of the winch assembly 100 are in a degree of compression when the winch assembly 100 is in use, enhancing the strength and durability of the overall arrangement. Further, the use of the angled mounting plate 208 moves the crossmember 105 of the winch assembly 100, which remains even if the controls 104 are absent, to a position in which the crossmember 104 does not obstruct a view of or access to the winch line 106 from above.

Figure 3:
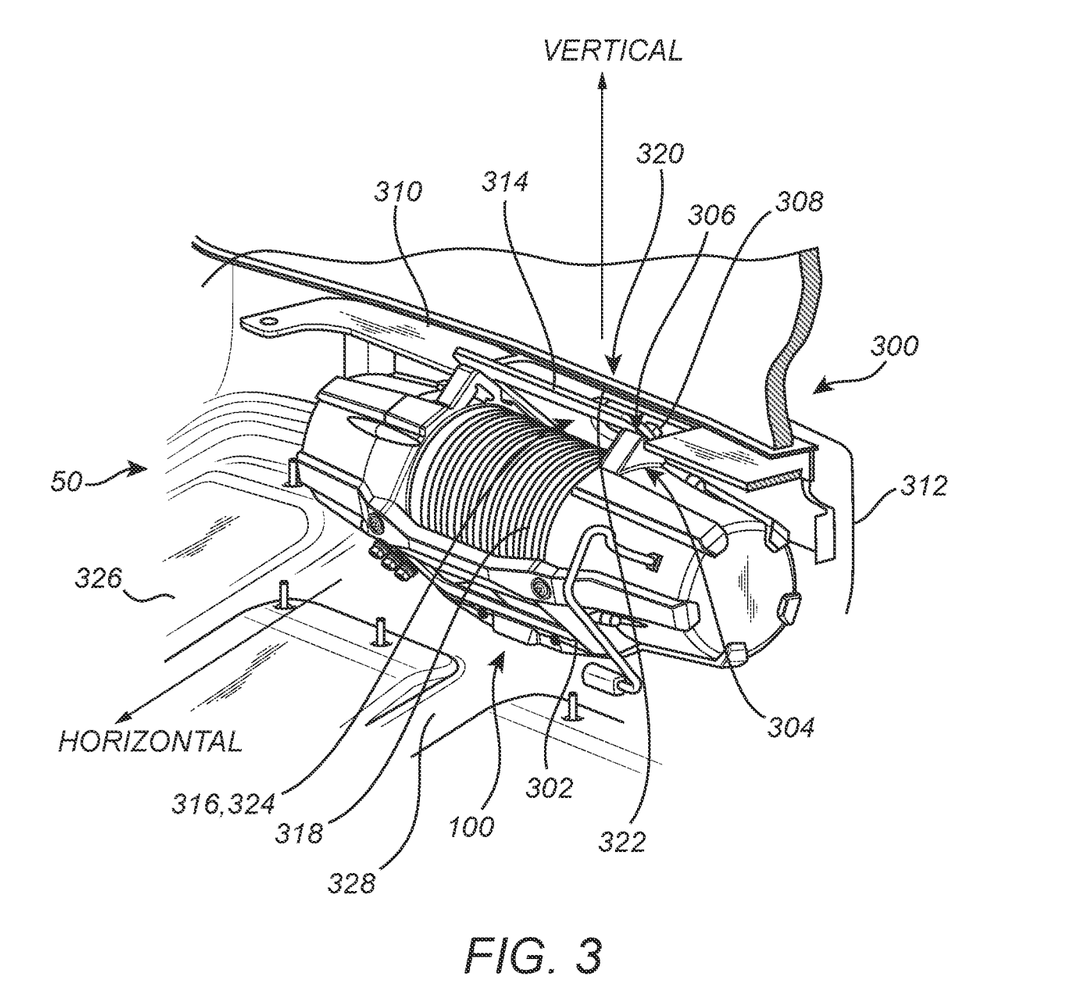
FIG. 3 is a perspective diagram illustrating a hidden configuration for mounting a winch assembly on a vehicle in accordance with one illustrative embodiment of the present disclosure, again highlighting the use of an angled mounting plate, a viewing/access window, and an optional skid plate access panel.

Referring specifically to FIG. 3, in one illustrative embodiment, the hidden winch assembly 300 (also referred to herein as the body assembly 300) of the present disclosure includes a winch assembly 100 from which the controls 104 (FIGS. 1A and 1B) have optionally been removed or are absent, such that the winch assembly 100 is controlled remotely from the cabin of the vehicle 50 or from a remote control (not illustrated). The winch assembly 100 includes a crossmember 302 on one side thereof, to which the controls 104 are typically mounted. On an opposite side, the winch assembly 100 includes a mounting structure 304 by which the winch assembly is mounted to the vehicle 50. This mounting structure 304 defines a plurality of mounting points 306 (typically four) at which the winch assembly is secured to the vehicle 50 using a plurality of bolts or other fasteners 308 (again, typically four).

The hidden winch assembly/body structure 300 also includes a bumper structure 310 to which the winch assembly 100 is actually secured, thereby coupling the winch assembly 100 to the frame (not illustrated) of the vehicle 50. This bumper structure 310 may be an exterior bumper structure, an interior bumper beam, an internal bumper structure disposed behind the exterior bumper structure or interior bumper beam, or a dedicated component intended to receive the winch assembly 100. In any case, the bumper structure 310 is preferably made from a metal, such as steel or aluminum, so that it is load bearing and is directly or indirectly coupled to the frame of the vehicle 50. In the embodiment illustrated, the bumper structure 310 is disposed behind a metal exterior bumper structure or plastic fascia component 312 that is visible from outside of the vehicle 50, although the bumper structure 310 could be the same component as this metal exterior bumper structure 312, for example. Of note, the bumper structure 310 is illustrated as being disposed at the front of the vehicle 50, although a similar arrangement could be used at the rear of the vehicle 50 or side of the vehicle 50 equally. Thus, a front body assembly 300 is illustrated.

The bumper structure 310 includes a mounting plate 314 disposed on a back side of the bumper structure 310. This mounting plate 314, which can also be made of a metal, such as steel or aluminum, may be integrally formed with or welded or otherwise rigidly affixed to the bumper structure 310 and is adapted to receive and retain the mounting structure 304 of the winch assembly 100, thereby securing the winch assembly 100 to the bumper structure 310 and the frame of the vehicle 50. In the embodiment illustrated, the mounting plate 314, the bumper structure 310, and/or the metal exterior bumper structure or plastic fascia component 312 define an opening 316 through which the winch line 318 passes to the exterior of the vehicle 50 in use, although the winch line 318 could simply pass around the mounting plate 314 and/or the bumper structure 310. Preferably, the mounting plate 314 is disposed at an angle between a vertical plane of the vehicle 50 and a horizontal plane of the vehicle 50, such as at a 45-degree angle (±15 degrees) from each/either of the vertical plane and/or the horizontal plane. When installed, this puts the winch assembly 100 in a feet-up-and-forward mounting arrangement, which puts the bolts or other fasteners 308 in a state of partial compression when the winch assembly 100 is in use, which is desirable.

When the winch assembly 100 is in use, it is desirable to be able to see the winch line 318 as the winch line 318 is spooled onto the winch assembly 100, such that tangles and the like can be avoided. To achieve this, a viewing window 320 is provided through the exterior of the vehicle 50. To keep dirt and debris out of the internal space of the vehicle 50 and to enhance aesthetics, this viewing window 320 includes a window cover 322 including includes one of a fixed panel, a removable access panel, a pivotable access panel, and a translatable access panel. This fixed panel, removable access panel, pivotable access panel, or translatable access panel may include a transparent viewing pane 524 (FIG. 5) disposed within a frame structure 526 (FIG. 5), such that the winch line 318 can be viewed without opening or removing the panel. To provide visibility, the mounting plate 314, the bumper structure 310, and/or the metal exterior bumper structure or plastic fascia component 312 again define an opening 324, which may or may not be the same as the opening 316 through which the winch line 318 passes to the exterior of the vehicle 50. In the embodiment illustrated, the window cover 322 is coupled to the metal exterior bumper structure or plastic fascia component 312 and the viewing openings 324 are the same as the openings 316 through which the winch line 318 passes to the exterior of the vehicle 50 with respect to the mounting plate 314 and the bumper structure 310.

The vehicle 50 may also include a skid plate 326 disposed on the bottom of the vehicle 50. This skid plate 326 may include a removable or openable access panel 328 disposed beneath the winch assembly 100, thereby providing access to the winch assembly 100 from underneath the vehicle 50 through the skid plate 326. This aides in service and the like. Because the skid plate 326 may be exposed to dirty and wet environmental conditions, the access panel 328 is preferably sealable within the skid plate 326 and all components are made from a durable, rigid metal, such as steel or aluminum.

Figure 4:
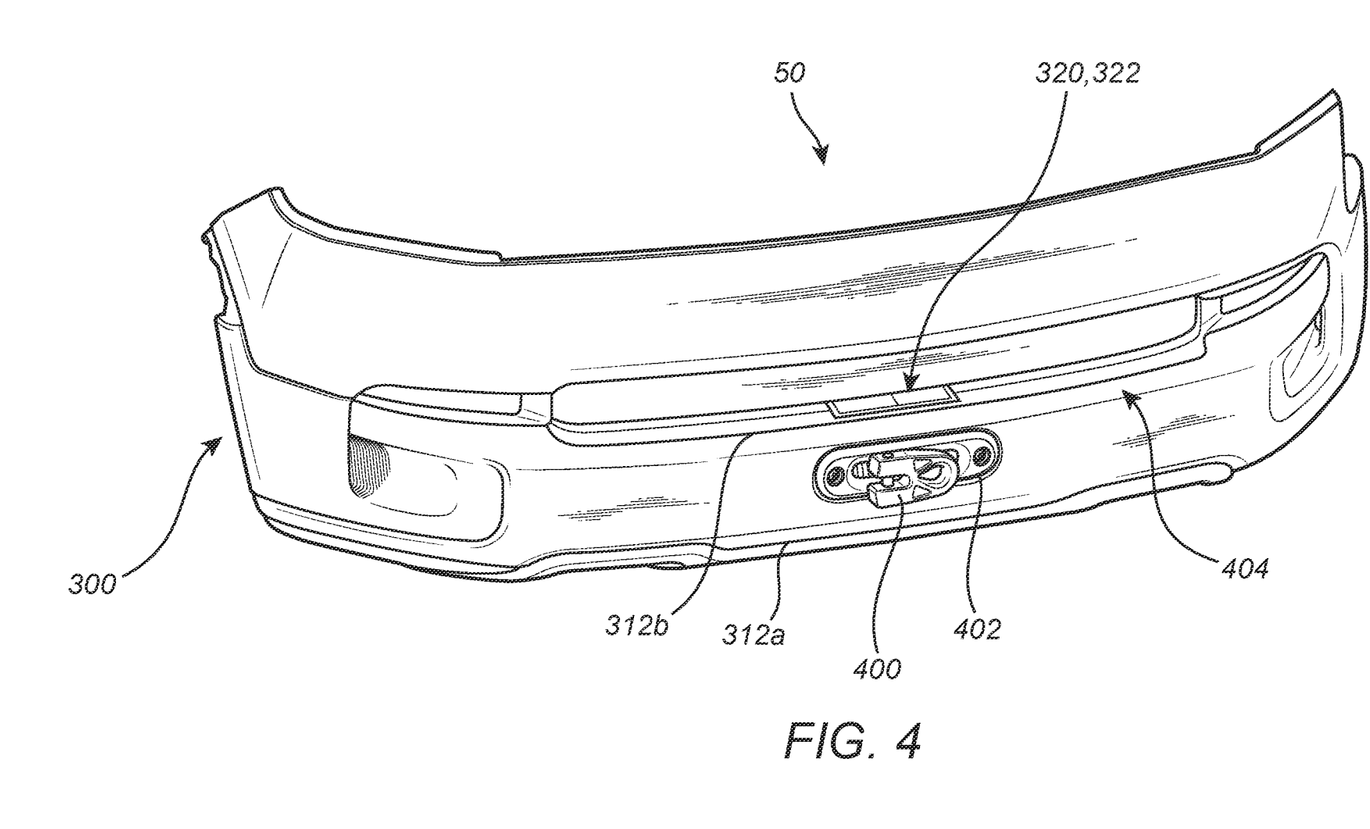
FIG. 4 is another perspective diagram illustrating a hidden configuration for mounting a winch assembly on a vehicle in accordance with one illustrative embodiment of the present disclosure, again highlighting the use of a viewing/access window.

Referring specifically to FIG. 4, in one illustrative embodiment, the bumper structure 310 (FIG. 3) of the front body assembly 300 is disposed behind a metal exterior bumper structure 312a of the vehicle 50, both of which are coupled to the frame (not illustrated) of the vehicle 50. A plastic or other fascia component 312b is disposed adjacent the exterior bumper structure 312a, both being visible from the exterior of the vehicle 50. In the embodiment illustrated, the fascia component 312b is nested within a recess 404 formed in a top portion of the exterior bumper structure 312a. Again, although a front body structure 300 is illustrated, a rear body assembly 300 could be configured similarly. Here, the winch hook 400 coupled to the winch line 318 (FIG. 3) protrudes through a fairlead bracket 402 disposed within the exterior bumper structure 312a. The viewing window 320 and window cover 322 are disposed within the fascia component 312b vertically above the fairlead bracket 402. In this case, the fixed panel, removable access panel, pivotable access panel, or translatable access panel of the window cover 322 includes a transparent viewing pane 524 (FIG. 5) disposed within a frame structure 526 (FIG. 5), such that the winch line 318 can be viewed without opening or removing the panel. In the embodiment illustrated, the window cover 322 is upward facing, but the window cover 322 could also be forward/rearward facing or disposed at an intermediate angle for easier viewing.

Figure 5:
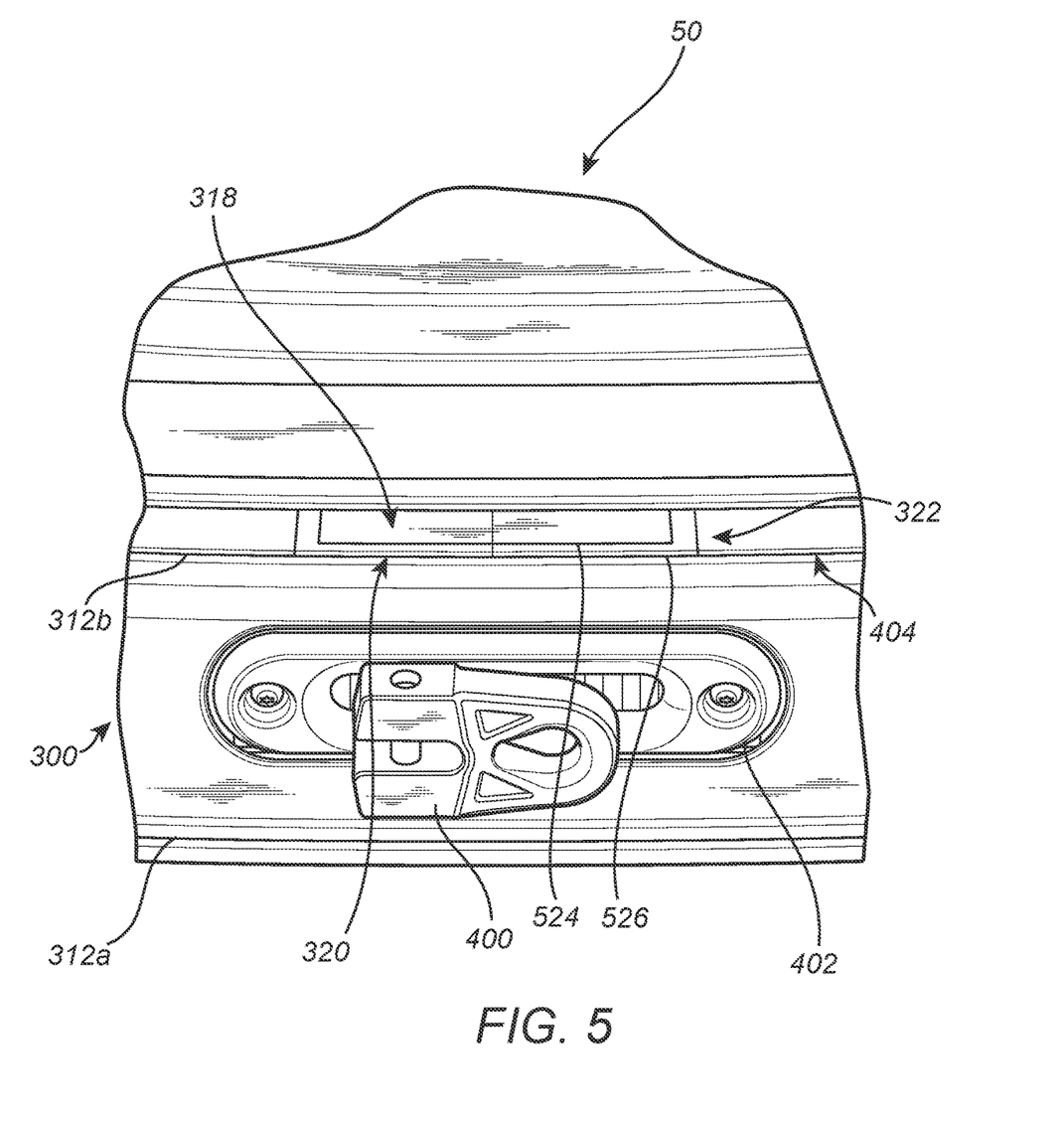
FIG. 5 is a further perspective diagram illustrating a hidden configuration for mounting a winch assembly on a vehicle in accordance with one illustrative embodiment of the present disclosure, again highlighting the use of a viewing/access window.

Referring specifically to FIG. 5, in one illustrative embodiment, the bumper structure 310 (FIG. 3) of the front body assembly 300 is disposed behind a metal exterior bumper structure 312a of the vehicle 50, both of which are coupled to the frame (not illustrated) of the vehicle 50. A plastic or other fascia component 312b is disposed adjacent the exterior bumper structure 312a, both being visible from the exterior of the vehicle 50. In the embodiment illustrated, the fascia component 312b is nested within a recess 404 formed in a top portion of the exterior bumper structure 312a. Again, although a front body structure 300 is illustrated, a rear body assembly 300 could be configured similarly. Here, the winch hook 400 coupled to the winch line 318 protrudes through a fairlead bracket 402 disposed within the exterior bumper structure 312a. The viewing window 320 and window cover 322 are disposed within the fascia component 312b vertically above the fairlead bracket 402. In this case, the fixed panel, removable access panel, pivotable access panel, or translatable access panel of the window cover 322 includes a transparent viewing pane 524 disposed within a frame structure 526, such that the winch line 318 can be viewed without opening or removing the panel. In the embodiment illustrated, the window cover 322 is upward facing, but the window cover 322 could also be forward/rearward facing or disposed at an intermediate angle for easier viewing. The frame structure 526 of the window cover 322 may be made of the same material as the surrounding fascia component 312b, and the transparent viewing pane 524 may be made of any suitable transparent plastic material, for example. It will be readily apparent to those of ordinary skill in the art that the entire window cover 322 may be opaque and simply be opened or removed to view or access the winch line 318.

Figure 6:
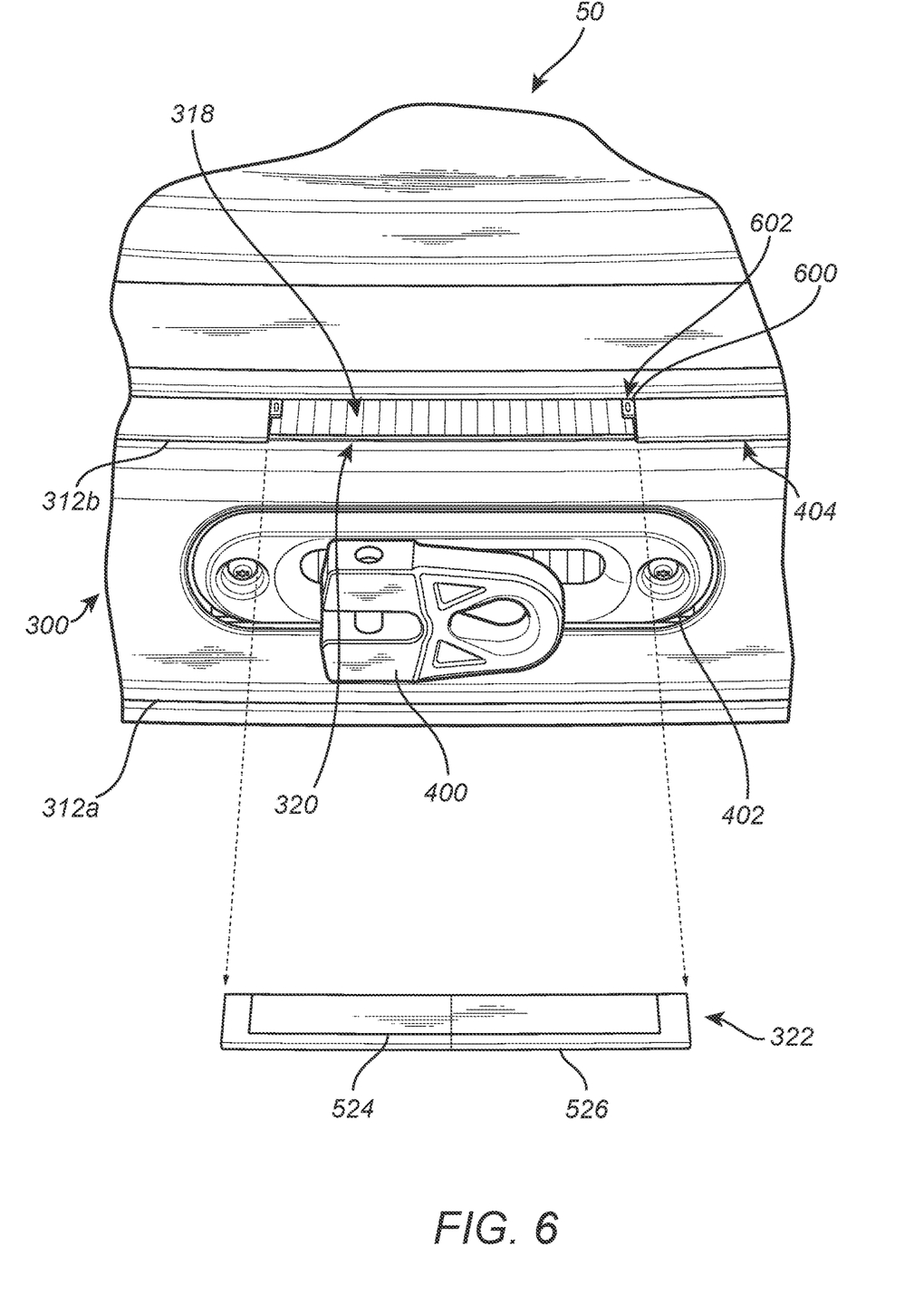
FIG. 6 is a further perspective diagram illustrating a hidden configuration for mounting a winch assembly on a vehicle in accordance with one illustrative embodiment of the present disclosure, again highlighting the use of a viewing/access window, with the viewing/access window in a removed configuration.

Referring specifically to FIG. 6, in one illustrative embodiment, the bumper structure 310 (FIG. 3) of the front body assembly 300 is disposed behind a metal exterior bumper structure 312a of the vehicle 50, both of which are coupled to the frame (not illustrated) of the vehicle 50. A plastic or other fascia component 312b is disposed adjacent the exterior bumper structure 312a, both being visible from the exterior of the vehicle 50. In the embodiment illustrated, the fascia component 312b is nested within a recess 404 formed in a top portion of the exterior bumper structure 312a. Again, although a front body structure 300 is illustrated, a rear body assembly 300 could be configured similarly. Here, the winch hook 400 coupled to the winch line 318 protrudes through a fairlead bracket 402 disposed within the exterior bumper structure 312a. The viewing window 320 and window cover 322 are disposed within the fascia component 312b vertically above the fairlead bracket 402. In this case, the fixed panel, removable access panel, pivotable access panel, or translatable access panel of the window cover 322 includes a transparent viewing pane 524 disposed within a frame structure 526, such that the winch line 318 can be viewed without opening or removing the panel. In the embodiment illustrated, the window cover 322 is upward facing, but the window cover 322 could also be forward/rearward facing or disposed at an intermediate angle for easier viewing. The frame structure 526 of the window cover 322 may be made of the same material as the surrounding fascia component 312b, and the transparent viewing pane 524 may be made of any suitable transparent plastic material, for example. It will be readily apparent to those of ordinary skill in the art that the entire window cover 322 may be opaque and simply be opened or removed to view or access the winch line 318. As illustrated, the window cover 322 is translatable and removable from opening 320 formed in the fascia component 312b, as opposed to being pivotable, for example. When engaged, the window cover 322 rests on an opposed pair of recessed shelf structures 600 disposed within the opening 320 formed in the fascia component 312b. To retain the window cover 322 within the opening 320, each of the shelf structures 600 may include a recess or hole 602 that is configured to receive an associated boss structure (not illustrated) provided on the back and/or bottom of the window cover 322, providing a snapping engagement of the components. It will be readily apparent to those of ordinary skill in the art that other retention mechanisms can be used equally. Preferably, the front and/or top surface of the window cover 322 sits flush with the corresponding surface of the fascia component 312b, such that the window cover 322 cannot be snagged and does not detract from the aesthetic appearance of the vehicle 50. It should be noted that the viewing window 320 can be made relatively smaller if simple visibility of the winch line 318 is desired and relatively larger if user finger or hand access to the winch line 318 is desired.

Referring again specifically to FIGS. 2 and 3, in various illustrative embodiments, the present disclosure provides a winch assembly 100 that is mounted feet-up-and-forward to and behind a bumper structure 102, 310 of a vehicle 50 and within the internal space of the vehicle 50 in a hidden configuration. Local winch assembly controls 104 (FIGS. 1A and 1B) are removed/not used and routed to the vehicle cabin or a remote control and the associated winch line (i.e., cable or rope) 106, 318 is routed around or through the bumper structure 102, 310, which is typically metal, and/or around or through any front exterior bumper or fascia components 110, 312, which are typically metal or plastic, disposed adjacent to the bumper structure 102, 310. This improves vehicle aerodynamics and aesthetics. Visibility of and access to the associated winch line 106, 318 and other winch components from outside the vehicle 50 is provided by a viewing window 200, 320 disposed through the bumper structure 102, 310 and/or through a front exterior bumper or fascia component 110, 312 adjacent to the bumper structure 102, 310. Further, access to the winch assembly 100 may be provided from underneath the vehicle 50 via an access panel 202, 328 disposed in a skid plate 204, 326 or the like coupled to the bottom of the vehicle 50 in the vicinity of the winch assembly 100. In general, the winch assembly 100 includes a mounting structure 206, 304 defining a plurality of mounting points 108, 306 disposed on one side of the winch assembly 100. The bumper structure 102, 310 includes a mounting plate 208, 314 disposed on a back side of the bumper structure 102, 310. The mounting plate 208, 314 is disposed at an angle between a vertical plane of the vehicle 50 and a horizontal plane of the vehicle 50. The mounting structure 206, 304 of the winch assembly 100 is coupled to the mounting plate 208, 314 of the bumper structure 102, 310 at the plurality of mounting points 108, 306 via a plurality of fasteners 308 (FIG. 3), such as bolts or the like. Due to the use of the angled mounting plate 208, 314, the fasteners 308 at the mounts 108, 306 of the winch assembly 100 are in a degree of compression when the winch assembly 100 is in use, enhancing the strength and durability of the overall arrangement.

The present disclosure is illustrated and described with reference to illustrative embodiments and specific examples thereof. It will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following non-limiting claims for all purposes.

What is claimed is:

1. An assembly for a vehicle, the assembly comprising:
   a winch assembly comprising a winch line and a mounting structure defining a plurality of mounting points disposed on one side of the winch assembly; and
   a bumper structure configured to be coupled to a frame of the vehicle, the bumper structure comprising a mounting plate disposed on a back side of the bumper structure, wherein the mounting plate is disposed at an angle between a vertical plane of the vehicle and a horizontal plane of the vehicle;
   a skid plate beneath the mounting plate of the bumper structure, wherein the skid plate comprises an access panel adapted to provide access to the winch assembly from underneath the vehicle;
   wherein the mounting structure of the winch assembly is coupled to a first surface of the mounting plate of the bumper structure at the plurality of mounting points via a plurality of fasteners, and wherein a normal vector of the first surface of the mounting plate extends through the winch assembly and towards an underside of the vehicle, and the winch line extends through the mounting plate.

2. The assembly of claim 1, wherein one or more of the mounting plate and the bumper structure define an opening adapted to allow the winch line of the winch assembly to pass through to an exterior of the vehicle.

3. The assembly of claim 1, wherein a top portion of the bumper structure defines an opening through which the winch assembly can be viewed and/or accessed from an exterior of the vehicle.

4. The assembly of claim 3, wherein the opening defined by the top portion of the bumper structure comprises one of a fixed panel, a removable access panel, a pivotable access panel, and a translatable access panel disposed therein.

5. The assembly of claim 4, wherein the one of the fixed panel, the removable access panel, the pivotable access panel, and the translatable access panel comprises a transparent viewing window.

6. The assembly of claim 1, wherein the bumper structure comprises an exterior bumper structure of the vehicle that is adapted to be coupled to the frame of the vehicle.

7. The assembly of claim 1, wherein the bumper structure comprises an internal bumper structure of the vehicle that is adapted to be coupled to the frame of the vehicle behind or through a bumper beam of the vehicle.

8. The assembly of claim 1, wherein the bumper structure comprises an internal bumper structure of the vehicle that is adapted to be coupled to the frame of the vehicle behind a fascia component of the vehicle.

9. The assembly of claim 1, wherein the angle is between about 30 degrees and about 60 degrees relative to the horizontal plane of the vehicle.

10. The assembly of claim 1, wherein the winch line extends through the mounting structure.

11. The assembly of claim 10, wherein the angle of the mounting plate is between about 30 degrees and about 60 degrees relative to the horizontal plane of the vehicle, and an angle of the mounting structure is between about 30 degrees and about 60 degrees relative to the horizontal plane of the vehicle.

12. A vehicle, comprising:
    a frame;
    a bumper structure coupled to the frame and comprising a mounting plate disposed on a back side of the bumper structure, wherein the mounting plate is disposed at an angle between a vertical plane of the vehicle and a horizontal plane of the vehicle, wherein the mounting plate is adapted to receive a plurality of fasteners for coupling a winch assembly including a winch line and a mounting structure defining a plurality of mounting points disposed on one side of the winch assembly to a first surface of the mounting plate, and wherein a normal vector of the first surface of the mounting plate extends through the winch assembly and towards an underside of the vehicle, and the winch line extends through the mounting plate;
    a skid plate disposed along a bottom of the vehicle beneath the mounting plate of the bumper structure, wherein the skid plate comprises an access panel adapted to provide access to the winch assembly from underneath the vehicle; and
    a fascia component disposed one or more of adjacent to and around the bumper structure.

13. The vehicle of claim 12, wherein one or more of the mounting plate, the bumper structure, and the fascia component define an opening adapted to allow the winch line of the winch assembly to pass through to an exterior of the vehicle.

14. The vehicle of claim 12, wherein one or more of a top portion of the bumper structure and the fascia component define an opening through which the winch assembly can be viewed and/or accessed from an exterior of the vehicle.

15. The vehicle of claim 14, wherein the opening defined by the one or more of the top portion of the bumper structure and the fascia component comprises one of a fixed panel, a removable access panel, a pivotable access panel, and a translatable access panel disposed therein.

16. The vehicle of claim 15, wherein the one of the fixed panel, the removable access panel, the pivotable access panel, and the translatable access panel comprises a transparent viewing window.

17. The vehicle of claim 12, wherein the bumper structure comprises an exterior bumper structure of the vehicle that is coupled to the frame of the vehicle.

18. The vehicle of claim 12, wherein the bumper structure comprises an internal bumper structure of the vehicle that is coupled to the frame of the vehicle behind or through a bumper beam of the vehicle.

19. A body assembly for a vehicle, the body assembly comprising:
    a bumper structure configured to be coupled to a frame of the vehicle, the bumper structure comprising a mounting plate, wherein the mounting plate is adapted to receive a plurality of fasteners for coupling a winch assembly including a winch line and a mounting structure defining a plurality of mounting points disposed on one side of the winch assembly to a first surface of the mounting plate, wherein the mounting plate is disposed at an angle between a vertical plane of the vehicle and a horizontal plane of the vehicle, and wherein a normal vector of the first surface of the mounting plate extends through the winch assembly and towards an underside of the vehicle, and the winch line extends through the mounting plate; and wherein a top portion of the bumper structure defines an opening through which the winch assembly can be viewed and/or accessed from an exterior of the vehicle, and wherein the angle of the mounting plate is between about 30 degrees and about 60 degrees relative to the horizontal plane of the vehicle, and an angle of the mounting structure is between about 30 degrees and about 60 degrees relative to the horizontal plane of the vehicle.

20. The body assembly of claim 19, wherein the mounting plate is disposed on a back side of the bumper structure at the angle between the vertical plane of the vehicle and the horizontal plane of the vehicle.

21. The body assembly of claim 19, wherein the opening defined by the top portion of the bumper structure comprises one of a fixed panel, a removable access panel, a pivotable access panel, and a translatable access panel disposed therein.

22. The body assembly of claim 21, wherein the one of the fixed panel, the removable access panel, the pivotable access panel, and the translatable access panel comprises a transparent viewing window.

* * * * *